Aug. 14, 1951     P. E. FENTON     2,564,524
FASTENER SETTING ADAPTER
Filed Nov. 24, 1948
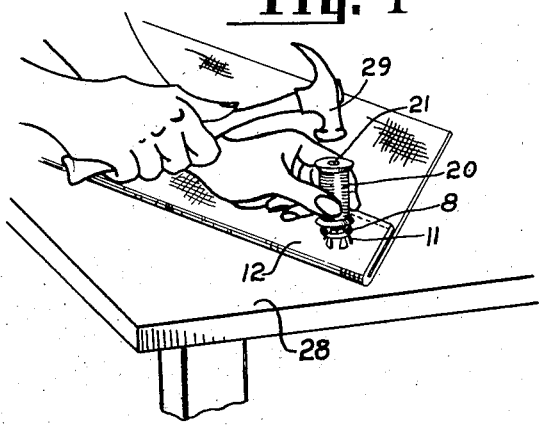
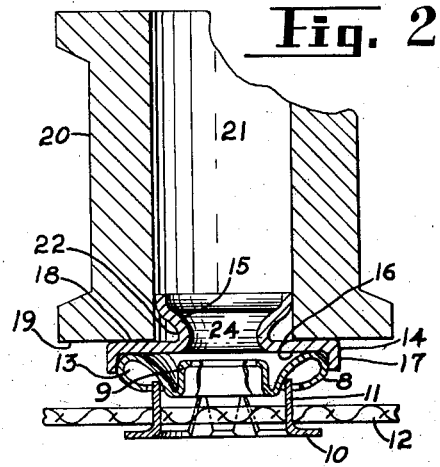
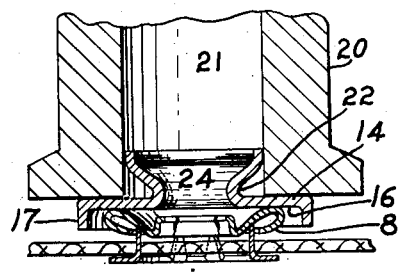
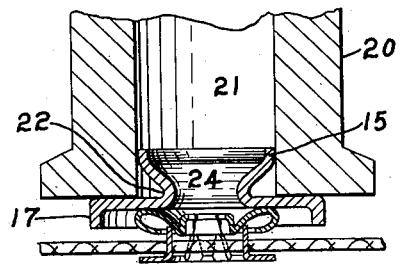
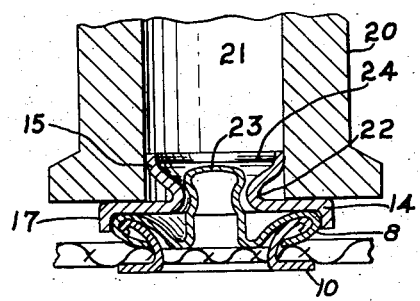
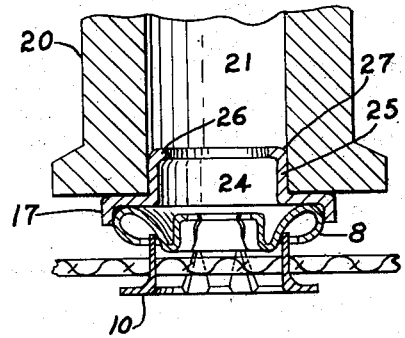
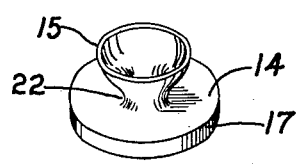
INVENTOR.
Paul E Fenton
BY
H. F. Johnston Patented Aug. 14, 1951

2,564,524

UNITED STATES PATENT OFFICE 2,564,524

FASTENER SETTING ADAPTER

Paul E. Fenton, Middlebury, Conn., assignor to Scovill Manufacturing Company, Waterbury, Conn., a corporation of Connecticut Application November 24, 1948, Serial No. 61,831

1 Claim. (Cl. 218—20)

My invention relates to a device for attaching snap fasteners to articles of clothing, furniture covers, and the like, especially intended for use in homes.

When snap fasteners came to be made which were sufficiently light, durable, and cheap that they were used widely on articles of clothing, furniture covers and numerous other things, it became desirable to make them available for attachment in the home. This presented a problem because it was out of the question to have in a home, machines or tools of the type customarily used in factories for attaching snap fastener parts. It was also not feasible to use common tools such as pliers, hammer and screwdriver because there was too much likelihood of damaging the small fastener parts or at best the result would be a poorly set and appearing job.

I am aware that attempts have been made to provide as cheaply as possible a small kit of special tools that would perform somewhat the same functions as the factory machines in attaching the fastener parts, and due to the great need in this field they have enjoyed some distribution in spite of important objections. The cost of such a kit of special tools is a considerable item. They are useful for nothing else but attaching snap fasteners and thus likely to become lost.

My copending application Ser. No. 693,765, filed August 29, 1946, since abandoned, discloses a method for home attachment of snap fastener parts requiring nothing more than a pencil with a rubber eraser on its end, a common sewing thread spool and any kind of a hammer. While this method has been widely welcomed by the public, it is only a partial solution. It will not suffice for attaching the smallest size fasteners now being used because the fasteners are almost as small, if not smaller than the hole in the spool. Even with the intermediate and larger sizes a degree of care had to be exercised in centering the spool on the fastener part and holding it squarely to distribute the blow evenly around the fastener part.

The object of my present invention is therefore to improve and extend the field of usefulness of the method referred to above. This application is a continuation in part of my copending application Ser. No. 693,766, filed August 29, 1946, since abandoned.

More particularly my objects are to provide an adapter or device for use with the thread spool which will better insure centering and even application of the blow to the snap fastener part; to provide a device permitting the spool to be used for the smaller sizes of snap fasteners; to provide a device that will protect the spool end from damage due to repeated use in attaching fastener parts; and to provide such a device which will be so small and so cheap to manufacture that it can be included in each package or card of snap fasteners as sold in the store without extra charge to the purchaser.

In the accompanying drawings I have shown two embodiments which my invention may assume in practice.

In these drawings:

Fig. 1 is a pictorial sketch illustrating the manner of using the device of my invention.

Fig. 2 is a central cross-sectional view of my device fitted to a spool and in contact with the socket part of a snap fastener ready to perform its function.

Fig. 3 is a view like Fig. 2 except illustrating how my device is used on a fastener of intermediate size.

Fig. 4 is also a view like Fig. 2 except illustrating how my device is used on a very small sized fastener part.

Fig. 5 is a similar section showing the use of my device with the stud part of a snap fastener, but with the fastener completely set upon a support.

Fig. 6 is a view similar to Fig. 2 showing one modification of my device, and

Fig. 7 is a perspective view showing the preferred form of my device, per se.

In illustrating the use of my invention sectional views of the socket part in Figs. 2, 3, 4, and 6 and of the stud part in Fig. 5, indicate one well known and common form of snap fastener. The socket part has a rigid curled over breast portion 8 surrounding the spring fingers 9 constituting the yielding socket for receiving a stud. This member is held in place by a pronged ring 10 whose prongs 11 project through a piece of fabric 12 or the like, in alignment with the entrance to the space 13 inside the breast portion 8 ready for final attaching operation.

Arranged over the socket part is my adaptor or device herein shown as formed of a single piece of sheet metal with a base 14 and a shank 15 projecting upwardly from the base at right angles thereto. The base preferably is formed as a round, flat, thin, disc-like member with a central hole, the bottom surface 16 of which is adapted to engage the breast portion 8, and it is of sufficient diameter to overlie a fastener part of the largest size it is desired to attach. A depending flange 17 extends around the periphery of the base to engage over the snap fastener to help center the device on the fastener part and to prevent its slipping sidewise out of contact with any part of the breast portion. Around the shank 15 the base 14 presents a flat top surface 18 to accommodate the end surface 19 of a common thread spool 20. The terms "spool" and "common thread spool" as used herein mean the small wooden spool on which sewing thread is wound and sold to the public through retail stores. Such spools while made in different sizes to accommodate different kinds and sizes of thread always have an axial hole, herein designated 21 of a standard size, the purpose being so that any of them will fit the standard size spindle on a sewing machine. The holes in such spools are approximately three tenths of an inch in diameter. Accordingly, by making the outside diameter of the shank of my device three tenths of an inch plus or minus about two thousandths of an inch it has been found that the shank may be easily pushed by the finger into the hole at either end of a spool and that it will fit snugly enough to retain the device in the spool during use.

The preferred form of my device embodies a feature enabling it to be useful in attaching even the smallest size snap fasteners now on the market as well as the larger sizes. While the upper end of the shank 15 is of the required diameter to fit the hole in the spool, the sheet metal walls of the shank are necked inwardly as at 22 so that the bottom surface 16 of the base extends radially inwardly sufficiently to have a good bearing on the breast portion of the small fastener shown in Fig. 4, and at the same time allowing a large enough hole through the base to receive the stud of the larger stud part as shown in Fig. 5. Of course, since the bottom surface 16, is flat it will accommodate any intermediate size as seen in Fig. 3.

The stud part in Fig. 5 is like the socket part as concerns the breast portion and prong ring and bears like reference characters. Instead of the spring fingers there is stud 23 which may be of the rigid or resilient type and which of necessity projects a considerable distance above the plane of the breast portion 8. When my device is used for attaching the stud part the stud projects through the central hole in the base 14 and into the recess 24 provided in the hollow shank. Preferably also this shank has an open top for lightness and cheapness, and for the further reason that any foreign particles or dirt which might get lodged in the recess can be easily removed.

In accordance with the showing in Fig. 6 of a modified construction of adaptor, the walls 25 of the shank may be straight if it is not desired to use the device for the smaller fasteners. Also the ends of the walls 25 may be formed inwardly to provide for a strengthening flange 26 and a rounding leading end 27, the latter end serving to facilitate the assembly of the adaptor with the spool hole 21.

The use of my device will now be readily understood. After the pronged ring has been located on the fabric and the prongs pierced through in any suitable manner such as by the eraser end of a pencil my small device is inserted into the end of a spool. The stud or socket part as the case may be is laid over the ends of the prongs with the prongs in the entrance to the breast portion. Then while holding the spool, now fitted with the metal adaptor, by the thumb and finger as illustrated in Fig. 1, the adaptor is fitted over the breast portion in substantially central position, and with the prong ring side resting on a flat surface such as a table 28 the spool is given one or more sharp taps with a hammer 29. This forces the breast portion down over the prongs, tightly against the fabric while the prongs curl up inside the breast portion to clinch the parts together. They are shown in the final position after the operation is completed in Fig. 5. The use of the spool is in a sense, a guard against a too severe blow being applied to the fastener parts to damage them. By reason of the size, weight, and material it is not likely to be struck as hard as one might strike a block or cylinder of metal. Furthermore the resiliency of the wood of which the spool is made will tend to cushion a too heavy blow, thus preventing damage to the fastener parts under any normal or expected circumstances. The metal adaptor while made of thin sheet metal will protect the wood from deformation so that the same spool can be used repeatedly.

From the foregoing description it will be evident that the objects stated have been accomplished. By reason of cheapness, convenience, simplicity, wide range of utility of and the good results obtainable with my device, the public may enjoy to a much greater extent the advantages of modern types of snap fasteners in their home manufactured garments, furniture covers, or other articles, with a minimum of labor and expense.

What I claim as new and desire to secure by Letters Patent is:

A fastener setting adaptor for use in conjunction with a common thread spool in attaching snap fastener parts, comprising a one-piece rigid member having a flat disc-like base portion with a central hole to receive the stud of the stud part of a snap fastener, said base portion having a peripheral depending flange to assist in positioning the adapter on a fastener part, and an integral hollow stem projecting upwardly from the edges of said hole at right angles to the base portion, said stem being dimensioned to fit snugly in the hole in such a thread spool with the end of the spool resting on the top surface of the base portion, whereupon a blow struck on the opposite end of the spool may be transmitted through said base portion without damaging the central parts of the fastener.

PAUL E. FENTON.

REFERENCES CITED

The following references are of record in the file of this patent:

UNITED STATES PATENTS

| Number | Name | Date |
| --- | --- | --- |
| 614,817 | Murphy | Nov. 22, 1898 |
| 667,554 | Murphy | Feb. 5, 1901 |
| 1,474,025 | Emerson | Nov. 13, 1923 |
| 1,560,486 | Rummins | Nov. 3, 1925 |
| 1,861,097 | Simons | May 31, 1932 |
| 2,312,457 | Weaver | Mar. 2, 1943 |
| 2,462,801 | Buckley | Feb. 22, 1949 |

FOREIGN PATENTS

| Number | Country | Date |
| --- | --- | --- |
| 8,490 | Great Britain | May 22, 1889 |
| 779,259 | France | Jan. 10, 1935 |